Sept. 17, 1929.  J. MALONYAŶ  1,728,209
POWER OPERATED PLOW OR OTHER AGRICULTURAL IMPLEMENT
Filed June 15, 1927
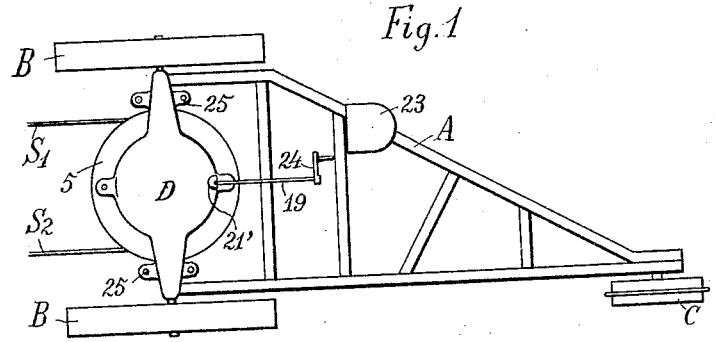
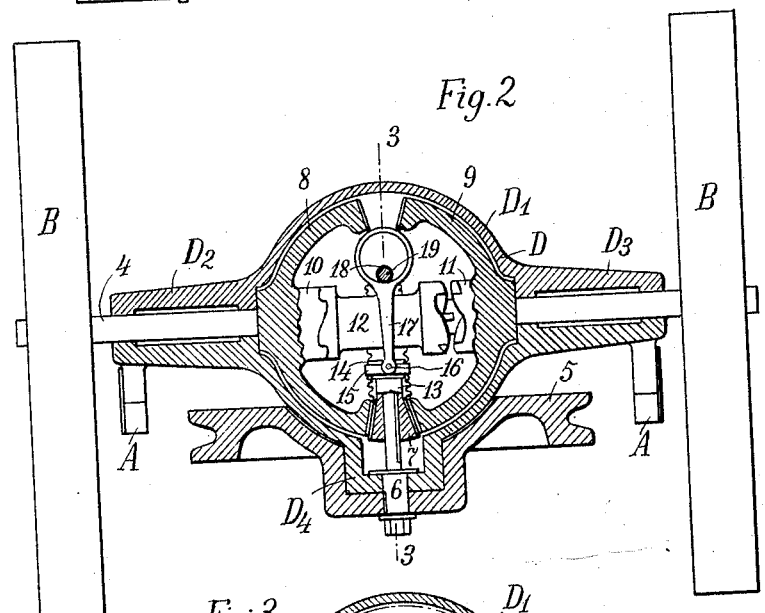
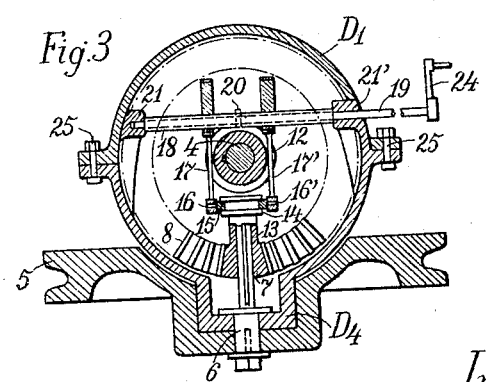
Inventor
John Malonyay
by (signature)
his attorney Patented Sept. 17, 1929.

1,728,209

UNITED STATES PATENT OFFICE

JOHN MALONYAY, OF SZEKSZARD, HUNGARY

POWER-OPERATED PLOW OR OTHER AGRICULTURAL IMPLEMENT

Application filed June 15, 1927, Serial No. 198,952, and in Hungary August 27, 1925.

My invention relates to power-operated plows or other agricultural implements on the single machine system and has particular reference to a known type of such plows or implements which is adapted to perform both the outward and inward draughts by means of a single rope and without the aid of anchoring devices in such a way that the rope wound with its ends on two winding drums mounted upon the driving machine, runs over a pulley mounted upon the plow or implement so as to serve, in the outward draught, as a driver for the ground wheels, and, in the inward draught, for a draw-hook. Either one of the winding drums is driven in both draughts, the other drum rotating loosely in the outward draught to unwind the rope and being braked or otherwise secured against rotation in the inward draught.

Heretofore, the said pulley was mounted on a countershaft parallel with the shaft of the ground wheels and power was transmitted from the countershaft to the shaft of the ground wheels, in one direction of rotation of the pulley corresponding to the winding up of the rope by the one drum, through a spur gearing, and in the other direction of rotation of the pulley corresponding to the winding up of the rope by the other drum, through a chain gearing in order to have the ground wheels driven always in the same direction corresponding to the outward draught. Thus, for the outward draught, the pulley was coupled, according to its direction of rotation, either with the spur gearing or with the chain gearing, while, for the inward draught, it was to be uncoupled from both gearings.

This known construction has many drawbacks, the principal ones being as follows:—

The frame of the plow or implement will tilt about the shaft of the ground wheels, the spur gear on the countershaft climbing up that on the shaft of the ground wheels, as soon as the ground wheels meet with a resistance above a very low limit against turning. The drawbacks generally adhering to chain gearings especially in agricultural machines are yet increased in this case by the fact that the shafts connected through the chain gearing are further connected through a spur gearing. The extensiveness of the gearing makes it difficult to enclose and keep in good order.

The object of my invention being to eliminate these drawbacks, I dispose the pulley on an axle which cuts the shaft of the ground wheels at right angles, and preferably beneath this shaft. In preventing thereby the tilting of the plow or implement about the shaft of the ground wheels, I at once render it possible to transmit the alternate rotatory movements of the pulley as always unidirectional rotations to the shaft of the ground wheels through a double bevel gear connection allowing at once to disconnect the shaft of the ground wheels from the axle of the pulley by simply ungearing the pinion which, for this purpose, is slidably mounted upon the axle of the pulley. The gearing being so simplified, I am able to give it a construction of such compactness as will allow to lodge the entire transmission mechanism together with the means for ungearing the pinion in a single casing which may comprise also the bearings for the shaft of the ground wheels and carry, if desired, the pulley, too. Thus I am able to concentrate the weight of all the driving mechanism and correlated parts upon the shaft of the ground wheels so that their adhesion becomes increased in a very advantageous manner.

In the drawings there is shown a constructional form of my invention, the driving machine carrying the winding drums each loosely mounted on, but adapted to be coupled to, a constantly driven shaft, and each provided with a brake, being omitted as known and not coming under the scope of my claims.

Fig. 1 is a plan of the implement which is assumed to be a plow, the shares being, however, not shown. Fig. 2 is a front view of the same plow on a larger scale and partly in section. Fig. 3 is a section on the line 3—3, Fig. 2.

A represents the frame of the plow in the usual, substantially triangular form, B, B are two front ground wheels, and C is a rear steering wheel. Secured to the front end of the frame is the lower half of a casing D which is divided along the shaft 4 of the ground wheels and consists of a hollow sphere $D_1$ having two lateral projections $D_2$, $D_3$ of a considerable length and a projection $D_4$ at the base. The lateral projections $D_2$, $D_3$ form bearings for the shaft 4, the projection $D_4$ carries on its outside the pulley 5 and shelters the axle 6 thereof, and the hollow sphere $D_1$ serves as an enclosure for the gearing to be described in what follows.

The upright axle 6 of the pulley 5 is disposed beneath the shaft 4 so as to cut the latter at right angles, and carries a pinion 7 slidably keyed thereon so as to be capable of being slid into and out of engagement with two bevel wheels 8 and 9 at the same time, which wheels sit loosely on the shaft 4. The disks of these bevel wheels have a hemispherical form in order to receive in the space between them a duplex clutch as well as the means for displacing the pinion 7. Said duplex clutch consists of two clutch members 10 and 11 integral with, or, if desired, secured to, the bevel wheels 8 and 9, respectively, and a coupling-box 12 slidably splined upon the shaft 4 and provided at both ends with ratchet teeth adapted to engage with similar teeth of the clutch members 10 and 11, the inclined sides of the ratchet teeth being so directed that the coupling-box will be engaged by the teeth of a clutch member 10 or 11 rotating in the direction corresponding to the backward movement or course of the plow, but thrust away by the teeth of a clutch member 11 or 10 rotating in the other direction. As the bevel wheels rotate always in opposite directions, one or the other of the clutch members 10 or 11 will always engage the coupling-box 12, thus causing the shaft 4 to rotate always in the direction corresponding to the outward draught of the plow whether the pulley 5 and the pinion 7 rotate in the one or other direction. Bevel wheel 8 is coupled to the shaft 4 when the run $S_1$ of the rope is drawn, and bevel wheel 9 is coupled to the shaft 4 when the run $S_2$ of the rope is drawn.

Instead of acting through the described duplex clutch, the bevel wheels 8 and 9 may, of course, act through any known types of one-way clutches upon the shaft 4.

For sliding the pinion 7 into and out of engagement with the bevel wheels 8 and 9, any known means may be employed but I give preference to the new means represented in Figs. 2 and 3 and constructed as follows:—

The upwardly prolonged hub 13 of the pinion 7 carries rotatably between the collars 14 a diametrically divided ring 15 which is attached by a pair of pivots 16, 16' to a pair of eccentric rods 17, 17'. The eccentric disks are keyed to a hollow shaft 18 having a shaft 19 passed through it and secured thereto by a pin 20. The hollow shaft is journaled in brackets 21, 21' projecting from the lower half of the hollow sphere $D_1$ into the space between the two bevel wheels 8 and 9. The rear end of the shaft 19 extends beyond the casing and carries a crank handle 24 within the grasp of the plowman on the seat 23.

The two halves of the casing may be tightly united by means of screw-bolts 25 and oil may be filled into the space enclosed. After unscrewing the bolts 25, the upper half of the casing may be removed, all the enclosed parts being left in their working positions.

In using the plow, for the outward draught the pinion 7 is slid into gear by giving half a turn to the crank handle 24. It will be understood from the above description that the pinion being in gear the ground wheels are driven and they are always driven in the direction corresponding to the backward movement or course of the plow whether run $S_1$ or run $S_2$ of the rope is drawn. For the inward draught, the pinion 7 is ungeared by turning the handle over into the former position. The pulley 5 being thus disconnected from the shaft of the ground wheels it may perform the service of a draw-hook on ordinary power-operated plows.

I am aware that a double bevel gear connection with duplex one-way clutch has already been employed for the transmission of alternate rotatory movements of a shaft as always unidirectional rotations to another shaft parallel with or perpendicular to said first shaft, and I do not claim such a mechanical movement in itself nor the mere application thereof to an agricultural implement of the type to which my invention relates, but—

What I claim is:

1. A power-operated agricultural implement, comprising a pair of ground wheels, a substantially horizontal shaft carrying said ground wheels, a pulley rotatable about an axis cutting said shaft at right angles, power transmission connections between said pulley and said shaft including one-way clutches to transmit alternate rotations of said pulley as unidirectional rotatory movements to said shaft, and means for disconnecting said power transmission connections.

2. A power-operated agricultural implement, comprising a pair of front ground wheels, a substantially horizontal shaft carrying said ground wheels, a rear steering wheel, a rotatable axle cutting said shaft at right angles, a pulley carried by said axle in a plane parallel with and beneath said shaft, power transmission connections between said pulley and said shaft including one-way clutches to transmit alternate rotations of said pulley as unidirectional rotatory movements to said shaft, and means for disconnecting said power transmission connections.

3. In a power-operated agricultural implement, a pair of ground wheels, a substantially horizontal shaft carrying said ground wheels, a pulley rotatable about an axis cutting said shaft at right angles, a pair of bevel wheels on said shaft, a pinion rotating with said pulley and adapted to be thrown in and out of engagement with both members of said pair of bevel wheels at the same time, and unidirectional driving connection between said pair of bevel wheels and said shaft.

4. In a power-operated agricultural implement, a pair of ground wheels, a shaft carrying said ground wheels, a rotatable axle cutting said shaft at right angles, a pulley secured to said axle, a pair of bevel wheels on said shaft, a pinion slidable on and rotatable with said axle and adapted to mesh with both members of said pair of bevel wheels at the same time, means for sliding said pinion along said axle into and out of mesh with said pair of bevel wheels, said means comprising a ring rotatable upon the prolonged hub of said pinion, a pair of eccentrics linked with their rods to said ring, a shaft carrying the disks of said pair of eccentrics, and a crank handle on the last-named shaft to operate said pair of eccentrics so as to throw said pinion into and out of mesh; and unidirectional driving connection between said pair of bevel wheels and the shaft carrying the ground wheels.

5. In a power-operated agricultural implement, the combination of a casing, a shaft within said casing, and a member rotatable with and slidable on said shaft, with external means for causing said member to slide along the shaft within said casing, said means comprising a ring rotatable upon said member about said shaft, a pair of eccentrics located within said casing and linked with their rods to said ring, a shaft carrying the disks of said pair of eccentrics and having one end projecting out of said casing, and a crank handle on said projecting end of said shaft to operate said pair of eccentrics.

6. In a power-operated argicultural implement, a pair of ground wheels, a shaft carrying said ground wheels, a rotatable axle cutting said shaft at right angles, a pulley secured to said axle, a pair of bevel wheels with hemispherical disks on said shaft, a pinion slidable on and rotating with said axle and adapted to mesh with both members of said pair of bevel wheels at the same time, means for sliding said pinion along said axle into and out of mesh with said pair of bevel wheels, and means establishing unidirectional driving connection between said pair of bevel wheels and said shaft, both last-named means being located in the space between said bevel wheels.

7. In a power-operated agricultural implement, a pair of ground wheels, a shaft carrying said ground wheels, a rotatable axle cutting said shaft at right angles, a pulley secured to said axle, a pair of bevel wheels with hemispherical disks on said shaft, a pinion slidable on and rotating with said axle and adapted to mesh with both members of said pair of bevel wheels at the same time, means for sliding said pinion into and out of mesh with said pair of bevel wheels, means establishing unidirectional driving connection between said pair of bevel wheels and said shaft, both last-named means being located in the space between said bevel wheels, and a casing consisting of a substantially spherical body with two lateral projections and a projection at the base, the spherical body enclosing said pair of bevel wheels together with the parts located in the space between them, the lateral projections forming bearings for said shaft, and the projection at the base of said casing serving for the reception of said pinion in its out-of-mesh position.

8. A power-operated agricultural implement, comprising a pair of ground wheels, a shaft carrying said ground wheels, a pulley rotatable about an axis cutting said shaft at right angles, means by which alternate rotatory movements of said pulley are transmitted as unidirectional rotatory movements to said shaft, means for disconnecting said pulley from said shaft, and a casing enclosing both said means and having two projections forming bearings for said shaft and a third projection upon which said pulley is mounted outside said casing.

In testimony whereof I have hereunto set my hand.

JOHN MALONYAY.